US012773714B2

(12) United States Patent
Yonekura et al.

(10) Patent No.: US 12,773,714 B2
(45) Date of Patent: Oct. 27, 2026

(54) MULTI-NOZZLE DEVICE AND METHOD FOR APPLYING FLUID USING MULTI-NOZZLE DEVICE

(71) Applicant: NHK SPRING CO., LTD., Yokohama (JP)

(72) Inventors: Ryosuke Yonekura, Yokohama (JP); Naoki Maeda, Yokohama (JP); Subaru Tomizawa, Yokohama (JP); Shinya Iwashita, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 52 days.

(21) Appl. No.: 18/315,135

(22) Filed: May 10, 2023

(65) Prior Publication Data

US 2023/0364634 A1 Nov. 16, 2023

(30) Foreign Application Priority Data

May 11, 2022 (JP) ................................ 2022-078267

(51) Int. Cl.
*B05C 5/02* (2006.01)
*B05C 13/02* (2006.01)

(52) U.S. Cl.
CPC ............ *B05C 5/027* (2013.01); *B05C 13/025* (2013.01)

(58) Field of Classification Search
CPC .. B05B 1/14; B05B 7/08; B05C 5/027; B05C 13/025
USPC ....... 239/450, 536, 560, 561, 566, 550, 551, 239/562, 1
See application file for complete search history.

(56) References Cited

U.S. PATENT DOCUMENTS 1,947,755 A * 2/1934 Bucknam ................ F23D 14/54 431/278
2,715,484 A * 8/1955 Alexander ............. A23G 9/283 239/550

(Continued)

FOREIGN PATENT DOCUMENTS

CN 1443095 A 9/2003
JP H047057 A 1/1992

(Continued)

OTHER PUBLICATIONS

Chinese Office Action (and an English language translation thereof) dated Jul. 7, 2025, issued in counterpart Chinese Application No. 202310415793.2.

(Continued)

*Primary Examiner* — Christopher S Kim
(74) *Attorney, Agent, or Firm* — Holtz, Holtz & Volek PC

(57) ABSTRACT

A multi-nozzle device includes a nozzle body having a chamber into which fluid enters, a reference nozzle and a specific nozzle. The reference nozzle and the specific nozzle are each provided in the nozzle body. The inflow ends of the nozzles are communicated to the chamber. The outflow ends of the nozzles protrude from an end surface of the nozzle body. A length of the specific nozzle and a length of the reference nozzle differ from each other depending on the target discharge amount of the reference nozzle and the target discharge amount of the specific nozzle. An inner diameter of the specific nozzle and an inner diameters and of the reference nozzles and may be different from each other.

11 Claims, 7 Drawing Sheets

(56) References Cited

U.S. PATENT DOCUMENTS

| | | | | | |
|---|---|---|---|---|---|
| 2,964,248 | A | * | 12/1960 | O'Brien | B05B 1/04<br>239/597 |
| 5,264,036 | A | | 11/1993 | Haas et al. | |
| 6,764,720 | B2 | | 7/2004 | Pui et al. | |
| 8,773,819 | B2 | | 7/2014 | Ikeji et al. | |
| 9,481,173 | B2 | | 11/2016 | Ueda et al. | |
| 12,365,005 | B2 | | 7/2025 | Ikushima | |
| 2006/0283987 | A1 | | 12/2006 | Anderson | |
| 2025/0312811 | A1 | | 10/2025 | Ikushima | |

FOREIGN PATENT DOCUMENTS

| | | | |
|---|---|---|---|
| JP | H04313363 | A | 11/1992 |
| JP | H0786318 | A | 3/1995 |
| JP | 2002239438 | A | 8/2002 |
| JP | 2006175425 | A | 7/2006 |
| JP | 2007069449 | A | 3/2007 |
| JP | 2007098348 | A | 4/2007 |
| JP | 2008207084 | A | 9/2008 |
| JP | 2011156338 | A | 8/2011 |
| JP | 2013251018 | A | 12/2013 |
| JP | 2014028351 | A | 2/2014 |
| WO | 0187491 | A9 | 10/2002 |
| WO | 2021182146 | A1 | 9/2021 |

OTHER PUBLICATIONS

Japanese Office Action (and an English language translation thereof) dated Oct. 21, 2025, issued in corresponding Japanese Application No. 2022-078267.

* cited by examiner

MULTI-NOZZLE DEVICE AND METHOD FOR APPLYING FLUID USING MULTI-NOZZLE DEVICE

CROSS-REFERENCE TO RELATED APPLICATIONS

This application is based upon and claims the benefit of priority from prior Japanese Patent Application No. 2022-078267, filed May 11, 2022, the entire contents of which are incorporated herein by reference.

BACKGROUND OF THE INVENTION

1. Field of the Invention

The present invention relates to a multi-nozzle device which applies a viscous liquid fluid onto a workpiece and a method for applying the fluid using the multi-nozzle device.

2. Description of the Related Art

In order to cope with the high recording density of disk drives such as hard disk drives (HDDs), suspensions for disk drives with micro actuator elements made of piezoelectric materials and the like are known. Small electronic components such as the micro actuator elements are usually fixed to the workpiece by adhesive in a manufacturing step for the suspension. Here, in order to electrically connect the electronic components to terminals of the wiring section, conductive adhesives are used in some cases. Liquid-like or paste-like adhesive is an example of fluids referred to in this specification.

For some workpieces (for example, the suspension mentioned above), it is desirable to apply the adhesive to multiple locations on the workpiece at the same time during the workpiece manufacturing process. Here, in order to efficiently apply adhesive to multiple locations as in the case of the above-mentioned suspension, it is necessary to supply an appropriate amount of adhesive to the multiple application locations at the same time by an automated application device.

As described in JP 2007-098348 A (Document 1), it is proposed to use a multi-nozzle device with multiple nozzles. Alternatively, as described in JP 2013-251018 A (Document 2), it has also been proposed to supply the appropriate amount of adhesive from nozzles to the workpiece by an automated application device.

In order to apply an appropriate amount of adhesive to multiple locations on a workpiece at the same time by a multi-nozzle device, it is important to control the amount of adhesive discharged from each nozzle of the multi-nozzle device to an amount suitable for each respective application portion. For this reason, in the case of the multi-nozzle device described in Document 1, the amount of adhesive discharged from each nozzle is adjusted by a valve mechanism installed in the nozzle body.

The multi-nozzle device equipped with a valve mechanism as described in Document 1 has an increased size for the part of the valve mechanism. Moreover, the structure of the multi-nozzle device becomes complex and heavy. Under these circumstances, in the case of a device that applies adhesive at high speed to multiple application portions on a minute workpiece, such as a suspension for a disk drive, it is difficult to move the multi-nozzle device at high speed or to control the position of the multi-nozzle device at high accuracy.

An object of the embodiments of the present invention is to provide a multi-nozzle device which can apply an appropriate amount of fluid with a simple configuration without a valve mechanism and a method of applying fluid using the multi-nozzle device.

BRIEF SUMMARY OF THE INVENTION

According to one embodiment, a multi-nozzle device includes a nozzle body having a chamber into which a fluid enters, a reference nozzle and a specific nozzle provided in the nozzle body. A viscous liquid fluid (for example, adhesive) flows into the chamber. The reference nozzle includes an inflow end communicated to the chamber and an outflow end projecting outward from an end surface of the nozzle body, and has a predetermined nozzle length and a predetermined nozzle inner diameter. The specific nozzle is disposed with an interval from the reference nozzle and includes an inflow end communicated to the chamber and an outflow end projecting outward from the end surface. At least one of the nozzle length and the nozzle inner diameter of the specific nozzle is different from the nozzle length or the nozzle inner diameter of the reference nozzle.

According to the multi-nozzle device of this embodiment, an appropriate amount of fluid can be discharged from each nozzle without providing a valve mechanism. Further, it is also possible to prevent the structure of the multi-nozzle device from becoming more complex and heavy.

The nozzle body may include a recess portion at a location in an inner surface of the nozzle body, which corresponds to the inflow end of the specific nozzle, where the inflow end of the specific nozzle may be disposed therein, and the diameter of the recess portion is greater than the nozzle inner diameter of the specific nozzle. Further, the nozzle length of the specific nozzle may be less than the nozzle length of the reference nozzle, depending on a depth of the recess portion.

In the multi-nozzle device including the nozzle body, the reference nozzle and the specific nozzle integrated as one body, a length from the end surface of the nozzle body to the outflow end of the reference nozzle and a length from the end surface to the outflow end of the specific nozzle may be equal to each other.

In the multi-nozzle device according to one embodiment, the reference nozzle is formed from a first pipe, the specific nozzle is formed from a second pipe, and the nozzle body includes a first through-hole formed therein, and the nozzle body includes a second through-hole formed therein. The first pipe is fixed to the nozzle body while being inserted to the first through-hole. The second pipe is fixed to the nozzle body while being inserted to the second through-hole. The inflow end of the reference nozzle and the inflow end of the specific nozzle each protrude to inside the chamber. Further, a length from the inner surface of the chamber to the inflow end of the specific nozzle may be less than a length from the inner surface to the inflow end of the reference nozzle.

The reference nozzle and the specific nozzle are arranged parallel to each other, and a length from the end surface of the nozzle body to the outflow end of the reference nozzle and a length from the end surface to the outflow end of the specific nozzles may be equal to each other.

The nozzle body, the reference nozzle and the specific nozzle are integrated as one body, the inflow end of the reference nozzle and the inflow end of the specific nozzle protrude to inside the chamber, and a length from the inner surface of the chamber to the inflow end of the specific nozzle may be less than a length from the inner surface to the inflow end of the reference nozzle.

The reference nozzle and the specific nozzles are arranged parallel to each other, and a length from the end surface of the nozzle body to the outflow end of the specific nozzle may be greater than a length from the end surface to the outflow end of the reference nozzle. A nozzle inner diameter of the specific nozzle may be less than a nozzle inner diameter of the reference nozzles.

According to one embodiment, there is provided a method of applying a fluid to a plurality of application portions of a workpiece using a multi-nozzle device by discharging the fluid thereto a same time. The multi-nozzle device includes a reference nozzle that discharges the fluid to one of the plurality of application portions and a specific nozzle that discharges the fluid to another application portion. A nozzle length or nozzle inner diameter of the specific nozzle is made different from a nozzle length or nozzle inner diameter of the reference nozzle according to a discharge amount of the reference nozzle and a discharge amount of the specific nozzle. The method comprises discharging the fluid from the reference nozzle to the one of the application portions, and at the same time, discharging the fluid from the specific nozzle to the another application portion.

When the discharge amount of the specific nozzle is less or greater than a target value, the specific nozzle may be replaced by another nozzle having a different nozzle length or nozzle inner diameter from that of the specific nozzle.

When the discharge amount of the specific nozzle is less than a target value, the nozzle length of the specific nozzle may be reduced by grinding a part of the specific nozzle. When the discharge amount of the specific nozzle is less than a target value, the nozzle inner diameter of the specific nozzle may be increased by grinding an inner surface of the specific nozzle. A discharge amount of the reference nozzle and a discharge amount of the specific nozzle may be calculated based on a Hagen-Poiseuille formula, and the nozzle length or the nozzle inner diameter of the specific nozzle may be obtained according to a discharge amount (target value) of the specific nozzle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

An application device 10 comprising a multi-nozzle device according to the first embodiment will be described below with reference to FIGS. 1 to 3. The application device 10 is not limited to the one shown in FIG. 1, but the application device 10 of this embodiment includes a multi-nozzle device 12. The multi-nozzle device 12 applies an adhesive 11 to multiple locations on a workpiece W at the same time.

An example of the workpiece W is a suspension for disk drives. The adhesive 11 is a viscous liquid and is an example of a fluid. Electronic components (for example, piezoelectric elements) are fixed to the workpiece W by the adhesive 11. In order to electrically connect a terminal of an electronic component to a wiring portion of the workpiece W, a conductive adhesive may be used.

Figure 1:
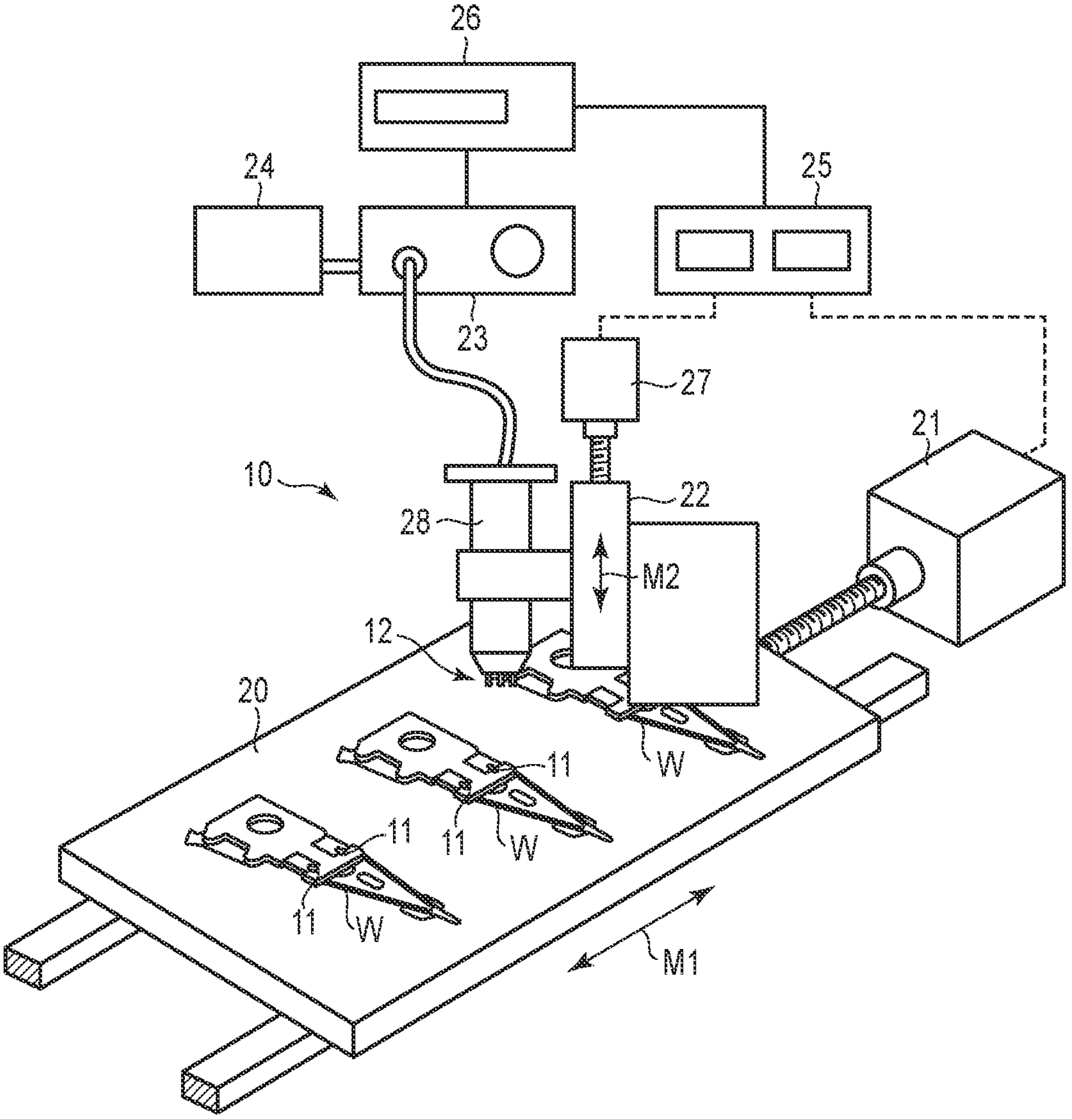
FIG. 1 is a perspective view schematically showing an example of an applying device.

An example of the application device 10 shown schematically in FIG. 1, includes a movable stage 20, a drive mechanism 21, an ascending/descending stage 22, a dispenser 23, a pressure supply source 24, a stage controller 25 and a control portion 26. A plurality of workpieces W are placed on the movable stage 20 at a predetermined pitch.

The drive mechanism 21 moves the movable stage 20 in both directions indicated by arrows M1 in FIG. 1. The ascending/descending stage 22 is moved by an ascending/descending mechanism 27 in both directions indicated by arrows M2. The dispenser 23 includes a syringe 28 provided on the ascending/descending stage 22. The liquid adhesive 11 is dispensed from the multi-nozzle device 12 toward workpiece W. The adhesive 11 is pressurized by the pressure supplied to the syringe 28 from the pressure supply source 24. The pressure supplied to syringe 28 can be adjusted by a pressure adjustment mechanism.

An example of the adhesive 11 contains a binder of an organic resin such as epoxy resin and conductive particles as conductive particles mixed into the binder. An example of the binder is a thermosetting fluid, but it may as well be of a UV curable type. The adhesive 11 is cured by firing at low temperature.

At a distal end portion of the syringe 28, more specifically, at a lower portion of the syringe 28, the multi-nozzle device 12 is provided. FIG. 2 shows a cross-sectional view of the multi-nozzle device 12 along the vertical direction. FIG. 3 shows a horizontal cross-sectional view of the multi-nozzle device 12 taken along line F3-F3 in FIG. 2. The multi-nozzle device 12 includes a hollow nozzle body 30, a first reference nozzle 31, a second reference nozzle 32, and a specific nozzle 33 (a third nozzle). These nozzles 31, 32 and 33 are each installed in the nozzle body 30.

In the nozzle body 30, a chamber 30*a* is formed into which the adhesive enters. The nozzle body 30 and the nozzles 31, 32 and 33 may be made of any material, but, for example, the nozzle body 30 is made of metal or resin. The reference nozzles 31 and 32 are each constituted by a substantially straight metal-made first pipe P1. The specific nozzle 33 is constituted by a metal-made second pipe P2 of a length different from that of the reference nozzles 31 and 32.

Figure 2:
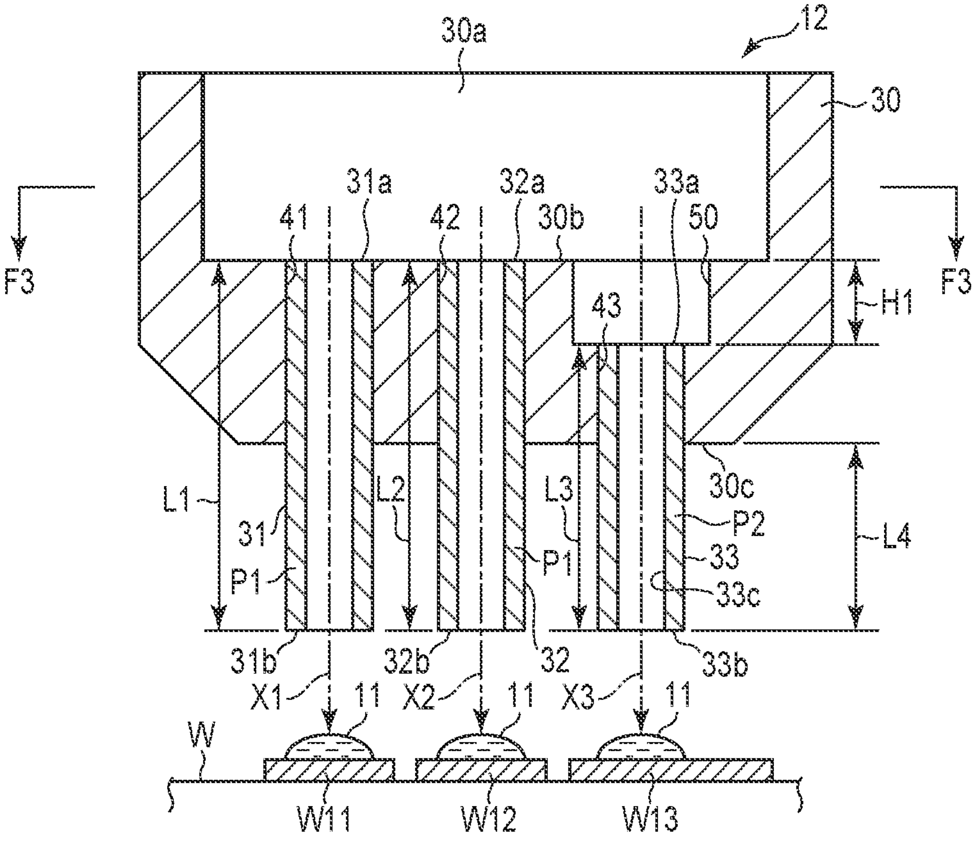
FIG. 2 is a cross-sectional view of a multi-nozzle device according to the first embodiment.

As shown in FIG. 2, the first reference nozzle 31 has a predetermined first nozzle length L1. The second reference nozzle 32 has a predetermined second nozzle length L2. The first nozzle length L1 and the second nozzle length L2 are equal to each other. In this specification, the first reference nozzle 31 may be referred to as the first nozzle and the second reference nozzle 32 as the second nozzle.

The specific nozzle 33 has a third nozzle length L3. The third nozzle length L3 is shorter than the first nozzle length L1 and the second nozzle length L2. In this specification, the specific nozzle 33 may be referred to as the third nozzle for convenience. The nozzles 31, 32 and 33 are provided parallel to each other.

As shown in FIG. 2, respective axes X1, X2 and X3 of the nozzle 31, 32 and 33 are substantially straight. The expression "substantially straight" as used in this specification means straight within the range of shape errors (or tolerances) that inevitably occur in the process of manufacturing the multi-nozzle device 12.

Figure 3:
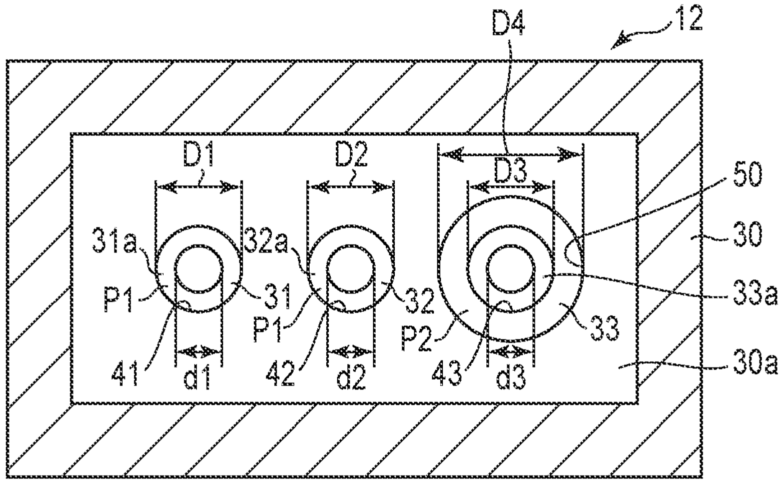
FIG. 3 is a cross-sectional view of the multi-nozzle device taken along line F3-F3 in FIG. 2.

As shown in FIG. 3, the reference nozzles 31 and 32 and the specific nozzle 33 have predetermined nozzle inner diameters d1, d2 and d3, respectively. The nozzle inner diameters d1, d2 and d3 of the respective nozzle 31, 32 and 33 are equal to each other. Respective outer diameters D1, D2 and D3 of the nozzle 31, 32 and 33 as well are equal to each other.

The reference nozzles 31 and 32 are each fixed to the nozzle body 30 when respectively inserted to first through-holes 41 and 42 formed in the nozzle body 30. The specific nozzle 33 is fixed to the nozzle body 30 when inserted to a second through-hole 43 formed in the nozzle body 30. As a means of securing the nozzles 31, 32 and 33 to the nozzle body 30, brazing can be adopted. Alternatively, the nozzles 31, 32 and 33 may be fixed to the nozzle body 30 by press fitting the nozzles 31, 32 and 33 respectively into the through-holes 41, 42 and 43.

The first reference nozzle 31 includes an end portion on an inflow side, that is, an inflow end 31*a*, and an end portion on an outflow side, that is, an outflow end 31*b*. The inflow end 31*a* is open to an inner surface 30*b* of the chamber 30*a*. The outflow end 31*b* is open to the respective workpiece W. The second reference nozzle 32 as well includes an inflow end 32*a* and an outflow end 32*b*. The specific nozzle 33 as well includes an inflow end 33*a* and an outflow end 33*b*.

The respective inflow ends 31*a* and 32*a* of the reference nozzles 31 and 32 are open to the inner surface 30*b* of the chamber 30*a* and are communicated with the chamber 30*a*. On the other hand, the inflow end 33*a* of the specific nozzle 33 is located in a recess portion (so-called "countersunk portion") 50 formed in the inner surface 30*b*. The inflow end 33*a* of the specific nozzle 33 is communicated with the chamber 30*a*. The recess portion 50 is circular when viewed from above. A diameter D4 of the recess portion 50 (shown in FIG. 3) is sufficiently larger than an inner diameter d3 of the specific nozzle 33. Thus, it is possible to reduce the flow resistance of the adhesive 11 flowing into the recess portion 50 to a negligibly small level. The recess portion 50 is formed at a position on the inner surface 30*b* of the chamber 30*a*, which corresponds to the inflow end 33*a* of the specific nozzle 33.

As shown in FIG. 2, the respective outflow ends 31*b* and 32*b* of the reference nozzles 31 and 32 and the outflow end 33*b* of the specific nozzle 33 protrude outwardly from the end surface 30*c* by a protrusion length L4 substantially equal to each other. The expression "substantially equal lengths" as used in this specification means lengths equal to each other within the range of shape errors (or tolerances) that inevitably occur in the process of manufacturing the multi-nozzle device 12.

The liquid adhesive 11 is supplied to the syringe 28 of the dispenser 23. The adhesive 11 in the syringe 28 is discharged from the multi-nozzle device 12 to the application portions W11, W12 and W13 (shown in FIG. 2) of the workpiece W by pressure of air, or the like delivered from the pressure supply source 24. The outflow ends 31*b* and 32*b* of the respective reference nozzles 31 and 32 correspond to one of the application portions (the first application portion W11 and the second application portion W12). On the other hand, the outflow end 33*b* of the specific nozzle 33 corresponds to the other application portion (the third application portion W13).

One reference nozzle 31 and the other reference nozzle 32 apply the adhesive 11 to the first application portion W11 and the second application portion W12, respectively, at the same time. On the other hand, the specific nozzle 33 applies the adhesive 11 to the third application portion W13 at the same time as that for the reference nozzles 31 and 32. In the example shown in FIG. 2, the amount of the adhesive 11 applied to the third application portion W13 is greater than the respective amount of the adhesive 11 applied to the first application portion W11 and the second application portion W12.

Figure 4:
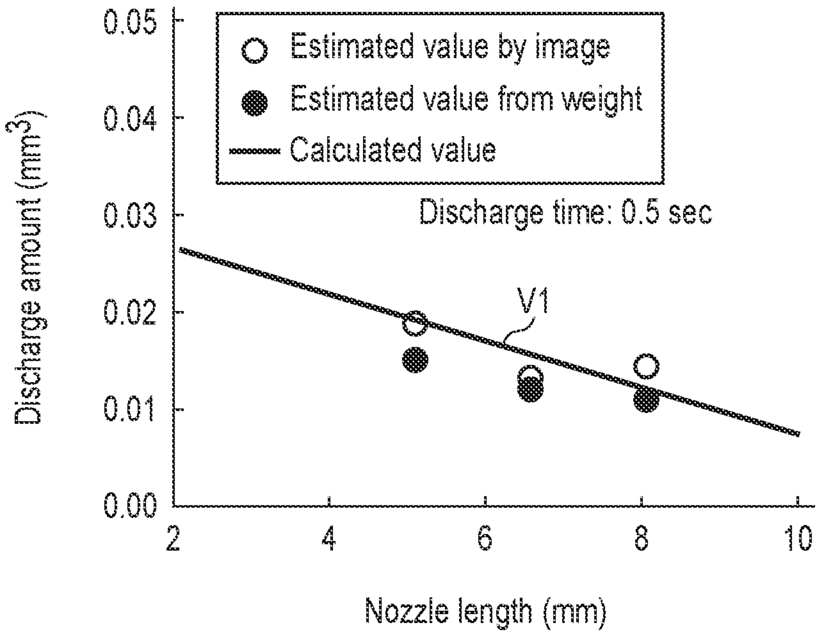
FIG. 4 is a diagram showing an example of the relationship between a nozzle length and discharge amount (when the discharge time is 0.5 seconds).
Figure 5:
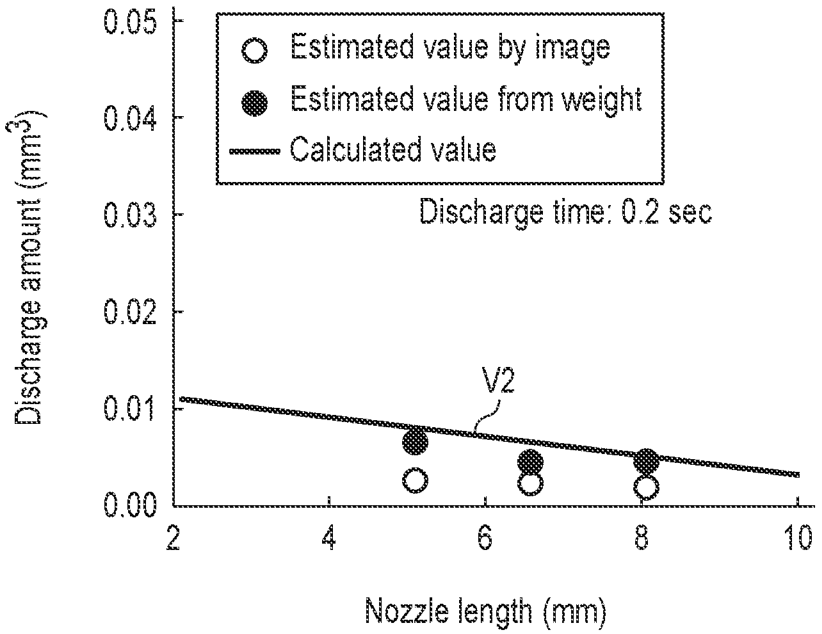
FIG. 5 is a diagram showing an example of the relationship between the nozzle length and the discharge amount (when the discharge time is 0.2 seconds).

FIG. 4 shows one example of the relationship between the nozzle length and the discharge amount when the discharge time is 0.5 seconds. FIG. 5 shows one example of the relationship between the nozzle length and the discharge amount when the discharge time is 0.2 seconds. White circles in FIGS. 4 and 5 each indicate a value obtained by picking up an image of the fluid discharged from the nozzle and estimating the discharge amount based on the picked up image. Black circles in FIGS. 4 and 5 each indicates a value obtained by measuring the weight of the fluid discharged from the nozzle and estimating the discharge amount based on the weight. In both cases of the discharge time durations of 0.5 and 0.2 seconds, as the nozzle length is larger, the discharge amount is less.

A line segment V1 in FIG. 4 and a line segment V2 in FIG. 5 indicate, respectively, values of the discharge amount obtained by calculation. A flow rate Q and a flow velocity can be calculated by the Hagen-Poiseuille formula (1). The discharge amounts indicated by the white circles in FIGS. 4 and 5 and the discharge amounts indicated by the black circles in FIGS. 4 and 5 are substantially identical to the flow rate Q calculated by the Hagen-Poiseuille's formula (1). The discharge amounts of the reference nozzles 31 and 32 and the discharge amount of the specific nozzle 33 may be calculated based on the Hagen-Poiseuille's formula (1), and the length of the specific nozzle 33 or the nozzle inner diameter may be determined according to the target discharge amount (target value) of the specific nozzle 33.

$$u(r) = -\frac{p_2 - p_1}{4\mu L}(R^2 - r^2) \quad \text{Formula (1)}$$

$$\begin{aligned} Q &= \int_0^R \int_0^{2\pi} u(r) r d\theta dr \\ &= 2\pi \frac{p_1 - p_2}{4\mu L} \int_0^R (R^2 - r^2) r dr \\ &= \pi \frac{p_1 - p_2}{2\mu L} \left[ \frac{1}{2} R^2 r^2 - \frac{1}{4} r^4 \right]_0^R \\ &= \frac{\pi R^4}{8\mu} \left( \frac{p_1 - p_2}{L} \right) \end{aligned}$$

Q: Flow amount

R: Nozzle inner radius

L: Nozzle length

μ: Viscosity $p_1$: Application pressure, $p_2$: Atmospheric pressure Hagen-Poiseuille Flow In the multi-nozzle device 12 shown in FIG. 2, the nozzle length L3 of the specific nozzle 33 is less than the nozzle lengths L1 and L2 of the reference nozzles 31 and 32. Consequently, the discharge amount of the specific nozzle 33 is greater than the respective discharge amounts of the reference nozzles 31 and 32. In other words, the respective discharge amounts of the reference nozzles 31 and 32 are different from the discharge amount of the specific nozzle 33. In this structure, the nozzles 31, 32 and 33 are disposed so that the appropriate amount of the adhesive 11 is discharged for each respective location of the application portions W11, W12 and W13.

In the multi-nozzle device 12 of this embodiment, the inflow end 33*a* of the specific nozzle 33 is located in the recess portion 50. Moreover, the nozzle 31, 32 and 33 has the same protrusion length L4. With this structure, the nozzle length L3 of the specific nozzle 33 becomes shorter according to a depth H1 of the recess portion 50. Therefore, the discharge amount of the specific nozzle 33 becomes greater than those of the reference nozzles 31 and 32. In other words, the discharge amount of the specific nozzle 33 can be adjusted according to the depth H1 of the recess portion 50. If the discharge amount of the specific nozzle 33 is less than the target value, an inner surface 33*c* of the specific nozzle 33 is ground to increase the inner diameter of the specific nozzle 33. In this manner, the discharge amount of the specific nozzle 33 can be brought closer to the target value.

Second Embodiment

Figure 6:
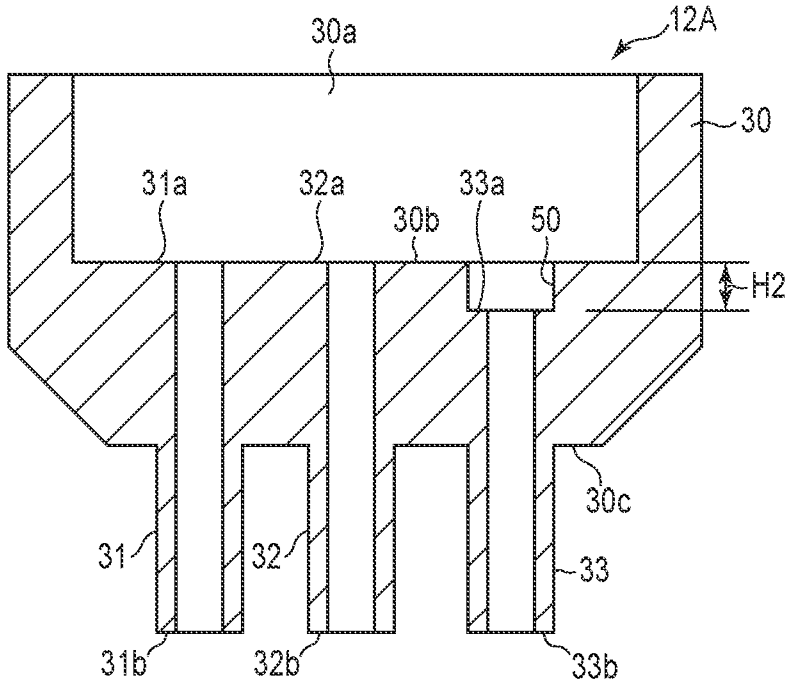
FIG. 6 is a cross-sectional view of a multi-nozzle device according to the second embodiment.

FIG. 6 shows a cross-section of a multi-nozzle device 12A according to the second embodiment. In this multi-nozzle device 12A, the nozzle body 30 and the nozzles 31, 32 and 33 are made as one part in which they are integrated with each other. The nozzles 31, 32 and 33 are formed as one piece together with the nozzle body 30 by the so-called machining process. The lengths from the end surface 30*c* of the nozzle body 30 to the respective outflow ends 31*b* and 32*b* of the reference nozzles 31 and 32 are equal to that from the end surface 30*c* to the outflow end 33*b* of the specific nozzle 33.

In the multi-nozzle device 12A of such an integrated nozzle configuration as well, the discharge amount of the specific nozzle 33 can be adjusted according to a depth H2 of the recess portion (countersunk portion) 50 as in the case of the multi-nozzle device 12 of the first embodiment (FIG. 2). The other configurations and operations of the integrated multi-nozzle device 12A are common to those of the multi-nozzle device 12 of the first embodiment (FIG. 2). Therefore, common members are denoted by the same reference symbols as those of the multi-nozzle device 12 of the first embodiment, and the explanations thereof will be omitted.

Third Embodiment

Figure 7:
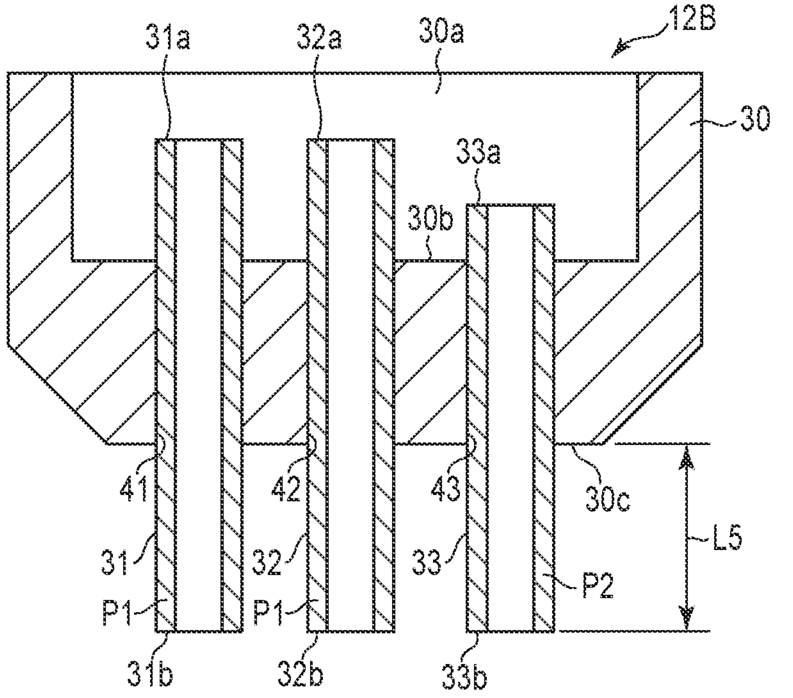
FIG. 7 is a cross-sectional view of a multi-nozzle device according to the third embodiment.

FIG. 7 shows a cross-section of a multi-nozzle device 12B according to the third embodiment. In the multi-nozzle device 12B, the inflow ends 31*a* and 32*a* of the respective reference nozzles 31 and 32 and the inflow end 33*a* of the specific nozzle 33 all protrude from the inner surface 30*b* of the chamber 30*a* to inside the chamber 30*a*. The lengths from the inner surface 30*b* to the respective inflow ends 31*a* and 32*a* of the nozzles 31 and 32 are equal to each other. On the other hand, the length from the inner surface 30*b* to the inflow end 33*a* of the specific nozzle 33 is less than the lengths from the inner surface 30*b* to the respective inflow ends 31*a* and 32*a* of the reference nozzles 31 and 32.

The height of the inflow end 33*a* of the specific nozzle 33 is less than the heights of the respective inflow ends 31*a* and 32*a* of the reference nozzles 31 and 32. The respective outflow ends 31*b* and 32*b* of the reference nozzles 31 and 32 and the outflow end 33*b* of the specific nozzle 33 all protrude equally from the end surface 30*c* of the nozzle body 30 by a length L5. In other words, the lengths from the end surface 30*c* of the nozzle body 30 to the respective outflow ends 31*b* and 32*b* of the reference nozzles 31 and 32 are equal to the length from the end surface 30*c* to the outflow end 33*b* of the specific nozzle 33.

As shown in FIG. 7, the lengths of the respective pipes P1 of the reference nozzles 31 and 32 are the same as each other. On the other hand, the length of the pipe P2 of the specific nozzle 33 is less than the lengths of the reference nozzles 31 and 32. The inner diameters of the respective nozzles 31, 32 and 33 (the inner diameters of the pipes P1 and P2) are the same as each other. With this structure, in the multi-nozzle device 12B (FIG. 7) of the third embodiment, the discharge amount of the specific nozzle 33 is greater than those of the reference nozzles 31 and 32 as in the case of the multi-nozzle device 12 (FIG. 2) of the first embodiment.

In the multi-nozzle device 12B shown in FIG. 7, for example, when the discharge amount of the specific nozzle 33 is less as compared to the target value, the inflow end 33*a* of the specific nozzle 33 is ground by machining to reduce the length of the specific nozzle 33. In this way, the discharge amount of the specific nozzle 33 can be increased. Here, alternatively, note that the discharge amount of the specific nozzle 33 can be changed by replacing the nozzle 33 with another nozzle of a different length.

Fourth Embodiment

Figure 8:
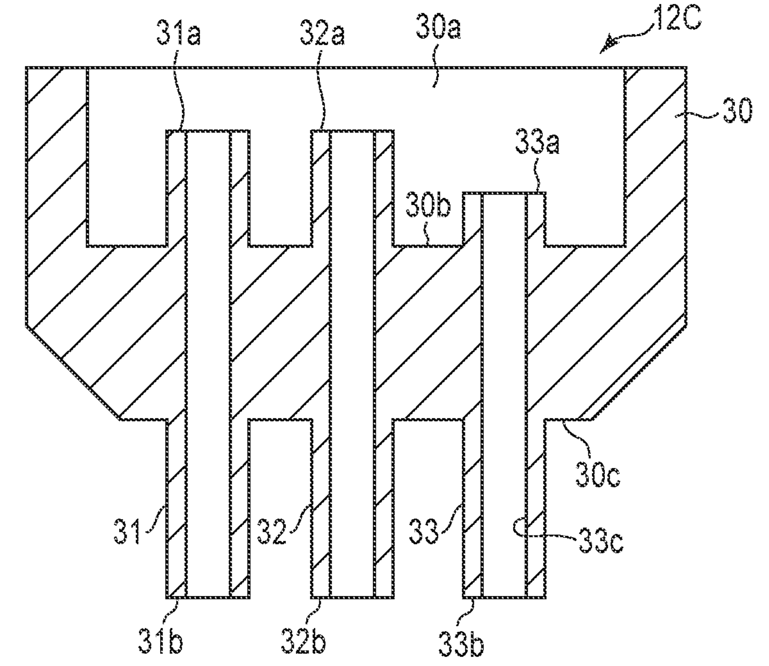
FIG. 8 is a cross-sectional view of a multi-nozzle device according to the fourth embodiment.

FIG. 8 shows a cross-section of a multi-nozzle device 12C according to the fourth embodiment. The multi-nozzle device 12C is made from one part in which the nozzle body 30, the reference nozzles 31 and 32, and the specific nozzles 33 are integrated with each other. The nozzles 31, 32 and 33 are formed to be integrated with the nozzle body 30 as one body by the so-called machining process. The inflow ends 31*a* and 32*a* of the reference nozzles 31, 32 and the inflow end 33*a* of the specific nozzle 33 protrude to inside the chamber 30*a*.

As shown in FIG. 8, the length from the inner surface 30*b* of the chamber 30*a* to the inflow end 33*a* of the specific nozzle 33 is less than the lengths from the inner surface 30*b* to the respective inflow ends 31*a* and 32*a* of the reference nozzles 31 and 32. The multi-nozzle device 12C is similar to the multi-nozzle device 12B (FIG. 7) of the third embodiment except that it is in the integrated nozzle form. Therefore, common members are denoted by the same reference symbols as those of the multi-nozzle device 12B of the third embodiment, and the explanations thereof will be omitted.

In the multi-nozzle device 12C shown in FIG. 8, the discharge amount of the specific nozzle 33 changes according to the height of the inflow end 33*a* of the specific nozzle 33 as in the case of the multi-nozzle device 12B shown in FIG. 7. The height of the inflow end 33*a* is the length of the specific nozzle 33 taken from the inner surface 30*b* of the chamber 30*a*. For example, when the discharge amount of the specific nozzle 33 is less than the target value, the inflow end 33*a* is ground by machining to reduce the length from the inner surface 30*b* to the inflow end 33*a*. In this way, the length of the specific nozzle 33 becomes less, and therefore the discharge amount of the specific nozzle 33 can be increased. When the discharge amount of the specific nozzle 33 is less than the target value, the inner surface 33*c* of the specific nozzle 33 is ground and the inner diameter of the specific nozzle 33 is increased. The discharge amount of the specific nozzle 33 may be increased by doing so.

Fifth Embodiment

Figure 9:
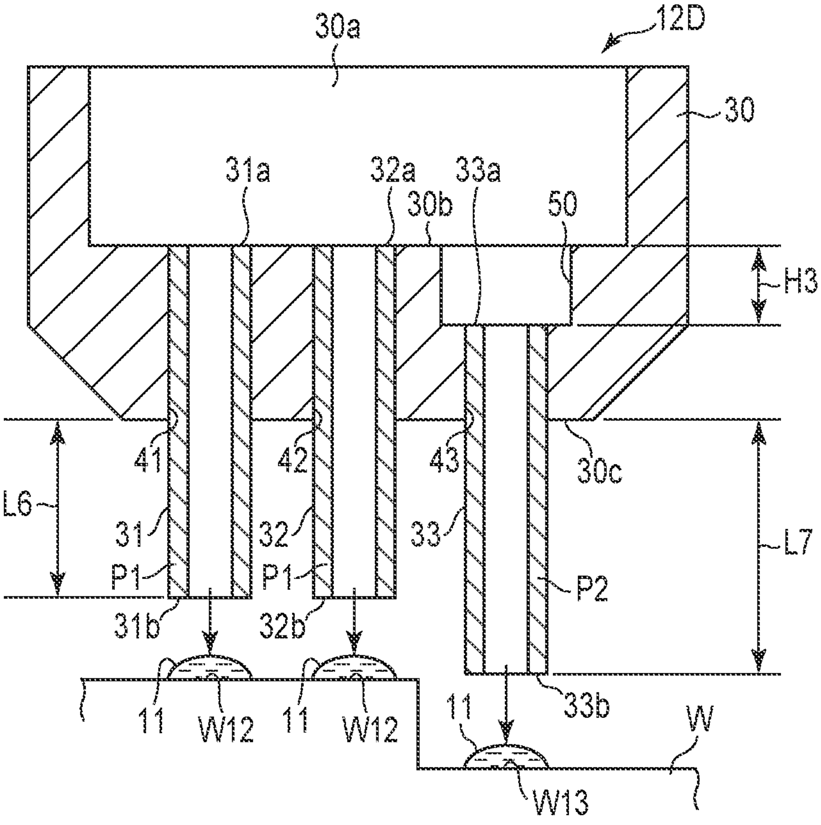
FIG. 9 is a cross-sectional view of a multi-nozzle device according to the fifth embodiment.

FIG. 9 shows a cross-section of a multi-nozzle device 12D according to the fifth embodiment. The multi-nozzle device 12D includes reference nozzles 31 and 32 each formed from a straight first pipe P1 and a specific nozzle 33 formed from a straight second pipe P2 as in the case of the multi-nozzle device 12 of the first embodiment (FIG. 2). The reference nozzles 31 and 32 and the specific nozzle 33 are arranged parallel to each other. The inflow end 33*a* of the specific nozzle 33 is located inside the recess portion (countersunk portion) 50 formed in the inner surface 30*b* of the chamber 30*a*.

As shown in FIG. 9, respective protrusion lengths L6 of the reference nozzles 31 and 32 are equal to each other. The protrusion lengths L6 are the lengths from the end surface 30*c* to the respective outflow ends 31*b* and 32*b*. On the other hand, a protrusion length L7 of the specific nozzle 33 is located lower than the outflow ends 31*b* and 32*b* of the reference nozzles 31 and 32 by a depth H3 of the recess portion 50. The protrusion length L7 is the length from the end surface 30*c* to the outflow end 33*b*. With this configuration, the multi-nozzle device 12D of the fifth embodiment is suitable for applying the adhesive 11 to the first application portion W11 and the second application portion W12 and the third application portion W13 located at a different height. Note here that the length of the pipe P2 of the specific nozzle 33 and the length of the pipes P1 of the reference nozzles 31 and 32 may be different from each other.

Sixth Embodiment

Figure 10:
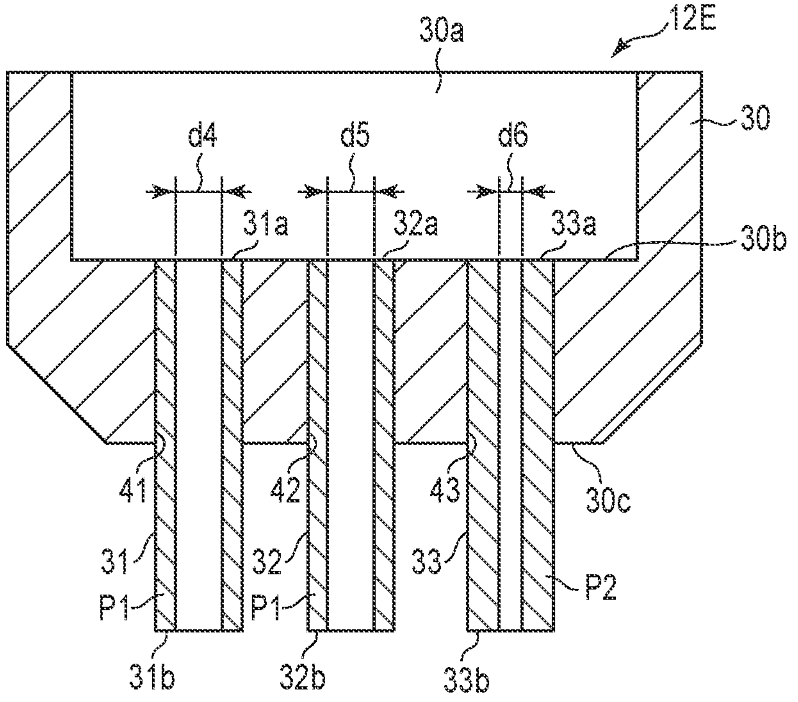
FIG. 10 is a cross-sectional view of a multi-nozzle device according to the sixth embodiment.

FIG. 10 shows a cross-section of a multi-nozzle device 12E according to the sixth embodiment. The reference nozzles 31 and 32 are each made from a metal-made first pipe P1. The specific nozzle 33 is made from a metal-made second pipe P2 of the same length as that of the first pipe P1. In the multi-nozzle device 12E of this embodiment, respective inner diameters d4 and d5 of the reference nozzles 31 and 32 are equal to each other. On the other hand, an inner diameter d6 of the specific nozzle 33 is less than the inner diameters d4 and d5 of the reference nozzles 31 and 32. The lengths of the nozzles 31, 32 and 33 are the same as each other.

The respective inflow ends 31*a*, 32*a* and 33*a* of the nozzles 31, 32 and 33 are open in the inner surface 30*b* of the chamber 30*a*. The heights (lengths from the end surface 30*c*) of the outflow ends 31*b*, 32*b* and 33*b* of the respective nozzle 31, 32 and 33 are the same as each other. The lengths of the nozzles 31, 32 and 33 are equal to each other. The inner diameter d6 of the specific nozzle 33 is less than the inner diameters d4 and d5 of the reference nozzles 31 and 32. With this structure, the discharge amount of the specific nozzle 33 is less than that of the reference nozzles 31 and 32. The other configurations and operations of the integrated multi-nozzle device 12E are common to those of the multi-nozzle device 12 of the first embodiment (FIG. 2). Therefore, common members are denoted by the same reference symbols as those of the multi-nozzle device 12 of the first embodiment, and the explanations thereof will be omitted.

Figure 11:
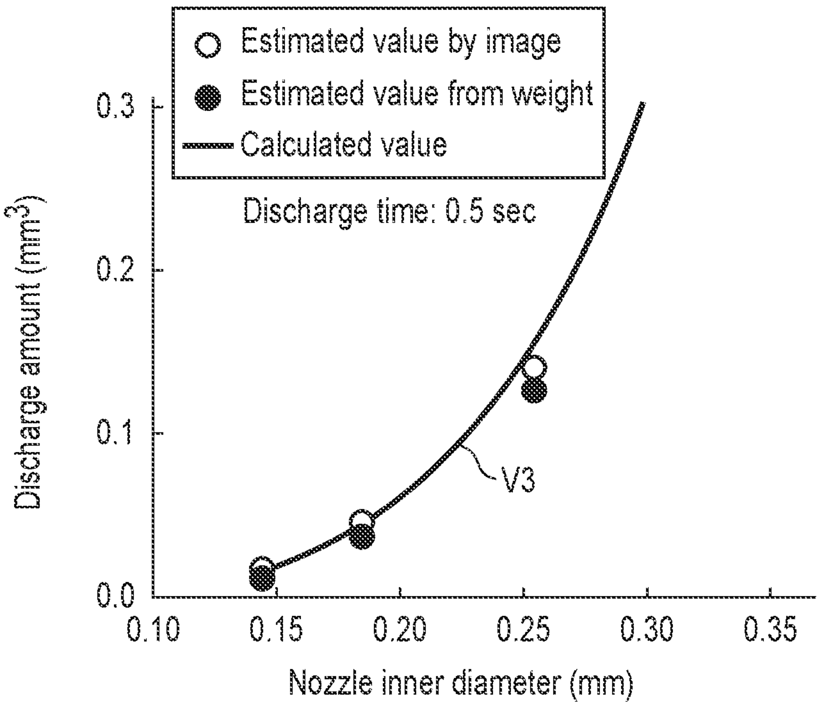
FIG. 11 is a diagram showing an example of the relationship between an inner diameter of the nozzle and the discharge amount (when the discharge time is 0.5 seconds).
Figure 12:
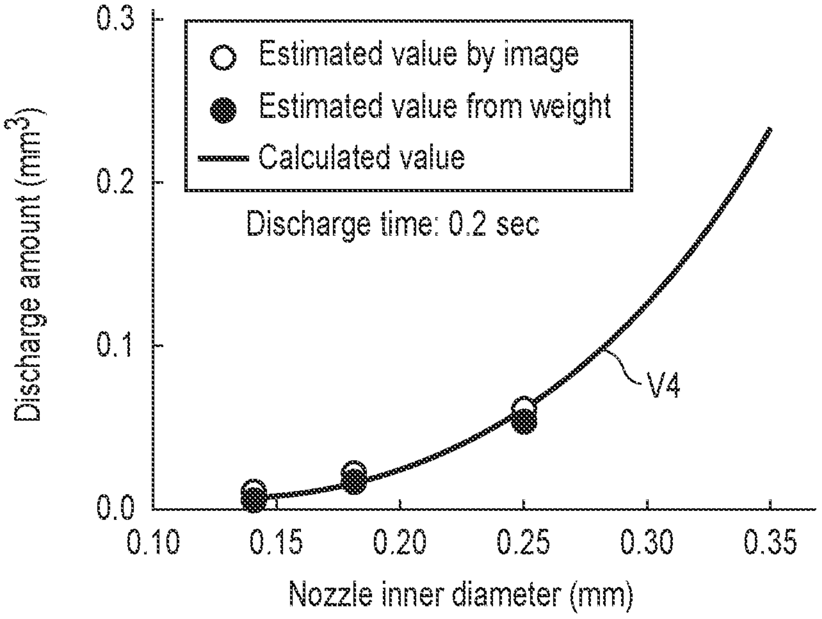
FIG. 12 is a diagram showing an example of the relationship between the inner diameter of the nozzle and the discharge amount (when the discharge time is 0.2 seconds).

FIG. 11 shows one example of the relationship between the nozzle inner diameter and the discharge amount when the discharge time is 0.5 seconds. FIG. 12 shows one example of the relationship between the nozzle inner diameter and the discharge amount when the discharge time is 0.2 seconds. White circles in FIGS. 11 and 12 each indicate a value obtained by picking up an image of the adhesive discharged from the nozzle and estimating the discharge amount based on the picked up image. Black circles in FIGS. 11 and 12 each indicates a value obtained by measuring the weight of the adhesive discharged from the nozzle and estimating the discharge amount based on the weight. In both cases of the discharge time durations of 0.5 and 0.2 seconds, as the nozzle inner diameter is larger, the discharge amount is less.

A line segment V3 in FIG. 11 and a line segment V4 in FIG. 12 indicate, respectively, values of the discharge amount calculated by the Hagen-Poiseuille formula (1) provided above. As shown, the nozzle inner diameter is greater, the discharge amount is larger. Therefore, if the discharge amount of the specific nozzle 33 is excessively small or large, it can be replaced with some other nozzle that has a different nozzle inner diameter, thus making it possible to optimize the discharge amount of the specific nozzle 33.

As described above, by making at least one of the nozzle length and the nozzle inner diameter of the specific nozzle different from the nozzle length or nozzle inner diameter of the reference nozzle, the discharge amounts of the reference nozzles and the specific nozzle can be optimized. Note that, for the nozzle length and nozzle inner diameter of the specific nozzle, the nozzle lengths and nozzle inner diameters of the respective reference nozzles may be made different from each other.

In implementing the present invention, the workpiece to which the adhesive is applied may be other than suspensions for disk drives. It goes without saying that the specific shape and dimensions of the nozzle body and the nozzles (reference nozzles and specific nozzle) that constitute the multi-nozzle device can be changed in various ways. The number of nozzles can also be determined as needed. The fluid may as well be anything other than adhesive, and can even be a paste-like fluid.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-nozzle device comprising:

a nozzle body including a chamber into which a fluid enters;

a first pipe configured to define a reference nozzle provided in the nozzle body, the reference nozzle including an inflow end communicating to the chamber and an outflow end projecting outward from an end surface of the nozzle body, and the reference nozzle having a predetermined first length and a predetermined first inner diameter; and a second pipe configured to define a specific nozzle, the specific nozzle being disposed at a distance from the reference nozzle, the specific nozzle including an inflow end communicating to the chamber and an outflow end projecting outward from the end surface of the nozzle body, and the specific nozzle having a second length and a second inner diameter, wherein:

the nozzle body includes a recess portion provided at a location in an inner surface of the nozzle body which corresponds to a location of the inflow end of the specific nozzle, the inflow end of the specific nozzle being disposed and opened at a bottom surface of the recess portion, a diameter of the recess portion is greater than an outer diameter of the second pipe, the first inner diameter and the second inner diameter are equal to each other, and the second length is less than the first length, the reference nozzle and the specific nozzle are arranged parallel to each other, and a length from the end surface of the nozzle body to the outflow end of the reference nozzle and a length from the end surface of the nozzle body to the outflow end of the specific nozzle are equal to each other.

2. The multi-nozzle device according to claim 1, wherein the second length is less than the first length by an amount corresponding to a depth of the recess portion.

3. The multi-nozzle device according to claim 2, wherein the nozzle body, the reference nozzle, and the specific nozzle are integrated as one body.

4. The multi-nozzle device according to claim 1, wherein:

the nozzle body includes a first through-hole formed therein, the nozzle body includes a second through-hole formed therein, the first pipe is fixed to the nozzle body in a state where the first pipe is received in the first through-hole, the second pipe is fixed to the nozzle body in a state where the second pipe is received in the second through-hole, the inflow end of the reference nozzle and the inflow end of the specific nozzle each protrude to an inside of the chamber, and a length from an inner surface of the chamber to the inflow end of the specific nozzle is less than a length from the inner surface of the chamber to the inflow end of the reference nozzle.

5. The multi-nozzle device according to claim 1, wherein:

the nozzle body, the reference nozzle, and the specific nozzle are integrated as one body, the inflow end of the reference nozzle and the inflow end of the specific nozzle protrude to an inside of the chamber, and a length from an inner surface of the chamber to the inflow end of the specific nozzle is less than a length from the inner surface of the chamber to the inflow end of the reference nozzle.

6. The multi-nozzle device according to claim 1, wherein the inflow end of the specific nozzle is coplanar with the bottom surface of the recess portion.

7. A method of applying a fluid to a plurality of application portions of a workpiece using the multi-nozzle device according to claim 1, the method comprising:

discharging the fluid from the reference nozzle to one of the application portions, and at the same time, discharging the fluid from the specific nozzle to another of the application portions.

8. The method according to claim 7, further comprising, in a case in which a discharge amount of the specific nozzle is less than or greater than a target value, replacing the specific nozzle with another nozzle having a different nozzle length or nozzle inner diameter from that of the specific nozzle.

9. The method according to claim 7, further comprising, in a case in which a discharge amount of the specific nozzle is less than a target value, reducing the nozzle length of the specific nozzle by machining a part of the specific nozzle.

10. The method according to claim 7, further comprising, in a case in which a discharge amount of the specific nozzle is less than a target value, increasing the nozzle inner diameter of the specific nozzle by machining an inner surface of the specific nozzle.

11. The method according to claim 7, further comprising:

calculating a discharge amount of the reference nozzle and a discharge amount of the specific nozzle based on a Hagen-Poiseuille formula, and determining at least one of the nozzle length and the nozzle inner diameter of the specific nozzle according to a target discharge amount of the specific nozzle.

* * * * *